(12) United States Patent
Fujishima

(10) Patent No.: US 6,218,738 B1
(45) Date of Patent: Apr. 17, 2001

(54) IGNITION CONTROL METHOD IN PASSIVE SAFETY DEVICE FOR VEHICLE

(75) Inventor: Hiromichi Fujishima, Toyota (JP)

(73) Assignee: Toyota Jidosha kabushiki Kaisha, Toyota (JP)

(*) Notice: Subject to any disclaimer, the term of this patent is extended or adjusted under 35 U.S.C. 154(b) by 0 days.

(21) Appl. No.: 09/241,051

(22) Filed: Feb. 1, 1999

(30) Foreign Application Priority Data

Feb. 18, 1998 (JP) ................................................. 10-035981

(51) Int. Cl.⁷ .................................................. B60R 21/16
(52) U.S. Cl. .......................... 307/10.1; 307/9.1; 280/735; 280/736
(58) Field of Search ..................................... 307/10.1, 9.1, 307/121; 280/735, 734, 728.1, 736; 340/436; 180/282

(56) References Cited

U.S. PATENT DOCUMENTS

| | | | |
|---|---|---|---|
| 4,438,424 | * 3/1984 | Yasui | 280/735 |
| 5,331,211 | * 7/1994 | Kondo et al. | 307/10.1 |
| 5,365,114 | * 11/1994 | Tsurushima et al. | 307/10.1 |
| 5,788,271 | * 8/1998 | Sotelo | 280/735 |

FOREIGN PATENT DOCUMENTS

| | | |
|---|---|---|
| 7-2051 | 1/1995 | (JP) . |
| 7-2052 | 1/1995 | (JP) . |
| 2559830 | 9/1996 | (JP) . |
| 8-282434 | 10/1996 | (JP) . |
| 9-240399 | 9/1997 | (JP) . |
| 96/26087 | 8/1996 | (WO) . |

* cited by examiner

*Primary Examiner*—Albert W. Paladini
(74) *Attorney, Agent, or Firm*—Pillsbury Winthrop LLP

(57) ABSTRACT

An ignition control method in a passive safety device for a vehicle is provided which can achieve a sufficiently long back-up time achieved by a back-up condenser for power supply. The ignition control method includes a mode-shifting step of shifting the operation mode of an ignition control device from a normal mode to a low-power-consumption mode.

10 Claims, 4 Drawing Sheets

F I G. 4A
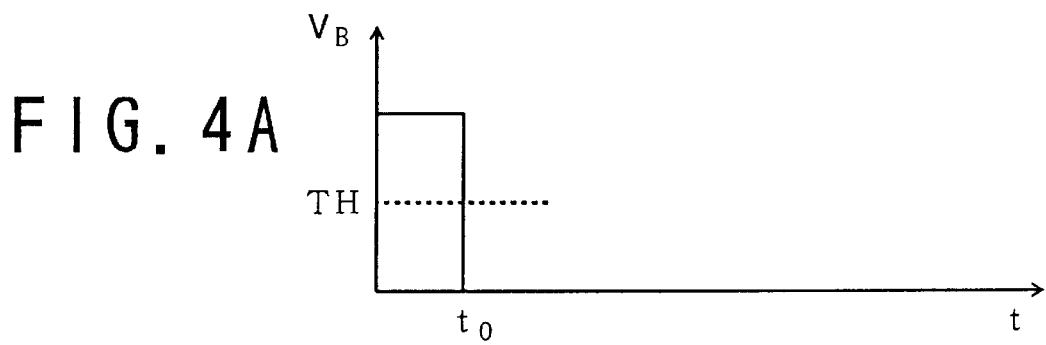
F I G. 4B
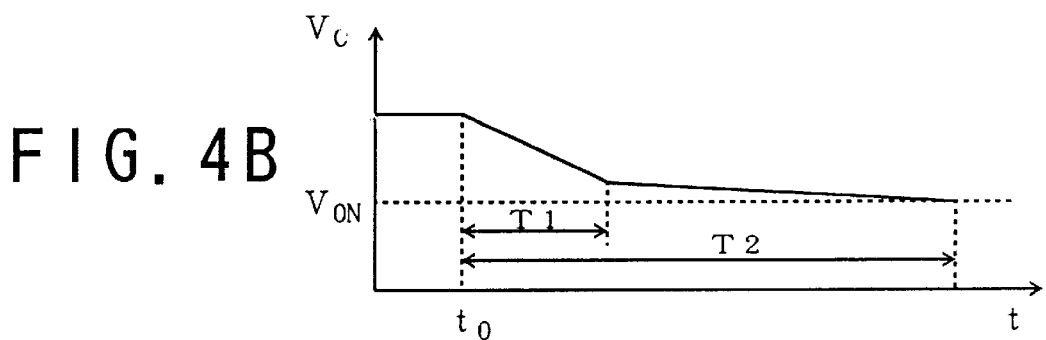
F I G. 5
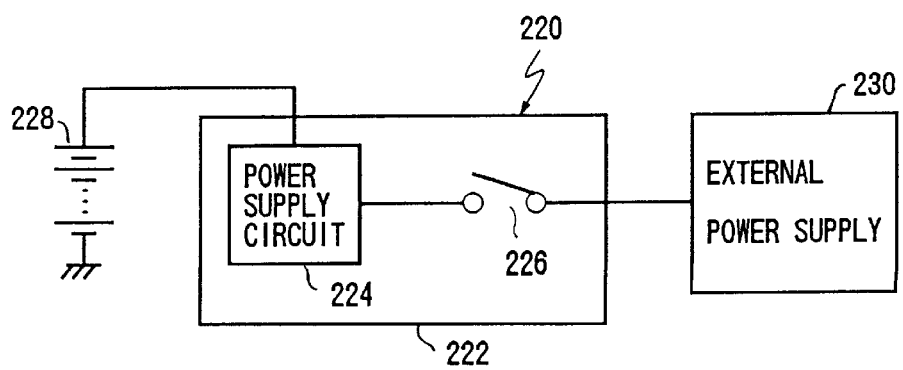

IGNITION CONTROL METHOD IN PASSIVE SAFETY DEVICE FOR VEHICLE

BACKGROUND OF THE INVENTION

1. Field of the Invention

The present invention relates to an ignition control method in a passive safety device for a vehicle, and in particular to an ignition control method in a passive safety device having air bags and pretensioners.

2. Description of the Related Art

Conventionally, as disclosed in Japanese Patent No. 2559830, an air bag system having a back-up condenser is known. This air bag system is normally operated with power supplied from an onboard battery. When the battery power supply is shut off, the system is operated with power supplied from the back-up condenser.

If a plurality of air bags are provided on a vehicle, the back-up condenser may be required to supply power to the plurality of air bags after the battery power supply is shut off. Additionally, requests of operation for the plurality of air bags may be generated with certain time lags. Thus, in a vehicle provided with a plurality of air bags, the back-up condenser must have a relatively long back-up time.

When an air bag is inflated, a path may be formed which short-circuits the ignition circuit corresponding to the inflated air bag. If the air bag is continued to be supplied with power in such a situation, the power stored in the back-up condenser is wasted by the inflated air bag. In this case, a sufficiently long back-up time cannot be achieved.

In the above-mentioned conventional air bag system, when electric energy charged in the back-up condenser has decreased to a predetermined extent, it is determined that one of the air bags is supplied with an ignition signal, and a power supply line to that air bag is shut off. Therefore, it is possible to positively prevent the inflated air bag from being supplied with power, so that electric power of the back-up condenser is not wasted. Thus, according to the conventional air bag system, it is possible to achieve a sufficiently long back-up time in a vehicle provided with a plurality of air bags.

However, the back-up time expected in the conventional air bag system is as short as 100 to 200 milli seconds. That is, the conventional air bag system is designed so as to be used to control front and side air bags which must be operated immediately after a phenomenon such as a collision has occurred which phenomenon could cause the shut-off of the battery power supply. Thus, the conventional air bag system can sufficiently satisfy a desired performance with the above-mentioned very short back-up time.

When a roll over of a vehicle has occurred, a passenger's head can be effectively protected if, for example, an air bag is inflated near the passenger's head. A roll over of a vehicle may occur a few seconds after a phenomenon causing the shutoff of the battery power supply has occurred. Thus, when an air bag for protecting a passenger's head (hereinafter referred to as a head-protecting air bag) is provided on a vehicle, a considerably long back-up time is required as compared to a case in which only front and side air bags are provided.

In a large-scale air bag system having the front air bags, the side air bags, and the head-protecting air bags, power consumption of an ignition control device becomes large. In such an air bag system, it is not possible to achieve a sufficiently long back-up time by using the conventional technique, that is, by shutting off power supply to the inflated air bag.

SUMMARY OF THE INVENTION

It is an object of the present invention to provide an ignition control method in a passive safety device for a vehicle which can achieve a sufficiently long back-up time when power supply is shut off.

The above-mentioned object of the present invention can be achieved by an ignition control method in a passive safety device for a vehicle for operating an ignition control device of the passive safety device using electric power stored in a back-up condenser when power supply is shut off, comprising:

a mode-shifting step of shifting an operation mode of the ignition control device from a normal mode to a low-power-consumption mode.

In this invention, the operation mode of the ignition control device is shifted from the normal mode to the low-power-consumption mode. According to the low-power-consumption mode, power consumption of the ignition control device is reduced. Thus, according to the invention, a relatively long back-up time can be achieved by using electric power stored in the back-up condenser after power supply is shut off.

In this case, the passive safety device may comprise a high-response safety device which requires a relatively short time to determine a request of operation, and a low-response safety device which requires a relatively long time to determine a request of operation, and the mode-shifting step may comprise an expected-state detecting step of detecting a predetermined state in which a request of operation to the low-response safety device is expected to occur and a condition determining step of determining an establishment of a condition for shifting to the low-power-consumption mode when at least one of the conditions that a predetermined time has elapsed after the shutoff of power supply and that the predetermined state is detected is established.

In this invention, the passive safety device includes a high-response safety device and a low-response safety device. It is necessary to achieve a sufficiently long back-up time after power supply is shut off to positively operate the low-response safety device. In the invention, if the low-power-consumption mode is achieved at a time when the predetermined time has elapsed after the shutoff of the power supply, a sufficiently long back-up time can be achieved without affecting the operation of the high-response safety device. Additionally, in the invention, if the low-power-consumption mode is achieved when a request of the operation to the low-response safety device is expected to be generated, the low-response safety device can be positively operated. Thus, according to the invention, it is possible to positively achieve a sufficiently long back-up time required to positively operate the low-response safety device.

The passive safety device may comprise a front air bag and a side air bag which require a relatively short time to determine a request of operation and a head-protecting air bag which requires a relatively long time to determine a request of operation.

In this invention, the front air bag and the side air bag are inflated with a high response so as to protect a passenger when a front collision or a side collision of a vehicle occurs. On the other hand, the head-protecting air bag is inflated so as to protect the vicinity of the passenger's head when, for example, a roll over occurs. In the invention, since a sufficiently long back-up time is achieved, it is possible to positively inflate the head-protecting air bag.

In the low-power-consumption mode, at least one of the processes of shutting off power supply to a request-of-operation detecting part which detects a request of operation to the front and side air bags, shutting off an ignition signal to an ignition device for the front and side air bags, and lowering an operation clock frequency of the ignition control device may be performed.

In the invention, requests of operation for the front air bag and the side air bag are to be detected immediately after the power supply is shut off. Thus, it is not necessary to operate the request-of-operation detecting part after a certain time has elapsed after the power supply is shut off. If power to the request of operation detecting part is shut off in such a situation, the low-power-consumption mode can be achieved without causing any substantial problems.

Similarly, requests of operation to the front and side air bags are not generated after a certain time has elapsed after the power supply is shut off. If the ignition signal is shut off in such a situation, the low-power-consumption mode can be achieved without causing any substantial problems.

Additionally, in the invention, it is not necessary to monitor a generation of a request of operation to the front air bag and the side air bag after a certain time has elapsed after the power supply is shut off. On the other hand, the head-protecting air bag need not be controlled with high response. For these reasons, if the clock frequency is lowered after a certain time has elapsed after the power supply is shut off, the low-power-consumption mode can be achieved without causing any substantial problems.

In the invention, at least one of the above-mentioned three processes is performed in the low-power-consumption mode. Therefore, it is possible to achieve a long back-up time sufficient for operating the head-protecting air bag without substantially affecting the operation of the front air bag and the side air bag.

The above-mentioned objects of the present invention can be also achieved by an ignition control method in a passive safety device for a vehicle, comprising:

a normal operation step of operating an ignition control device of the passive safety device using an onboard battery as power supply; and a back-up step of operating the ignition control device of the passive safety device using a second battery as power supply when the onboard battery is shut off.

In the invention, when the onboard battery is shut off, power supply to the passive safety device is switched from the onboard battery to the second battery. The second battery can supply sufficient power to the passive safety device. Thus, according to the invention, a sufficiently long back-up time can be achieved.

Other objects and further features of the present invention will be apparent from the following detailed description when read in conjunction with the accompanying drawings.

BRIEF DESCRIPTION OF THE DRAWINGS

FIG. 4A is a time chart showing a change in a battery voltage VB;

FIG. 4B is a time chart showing a change in a condenser voltage VC; and

FIG. 5 is a system structure diagram of a passive safety device for a vehicle of a second embodiment of the present invention.

DESCRIPTION OF THE PREFERRED EMBODIMENTS

Figure 1:
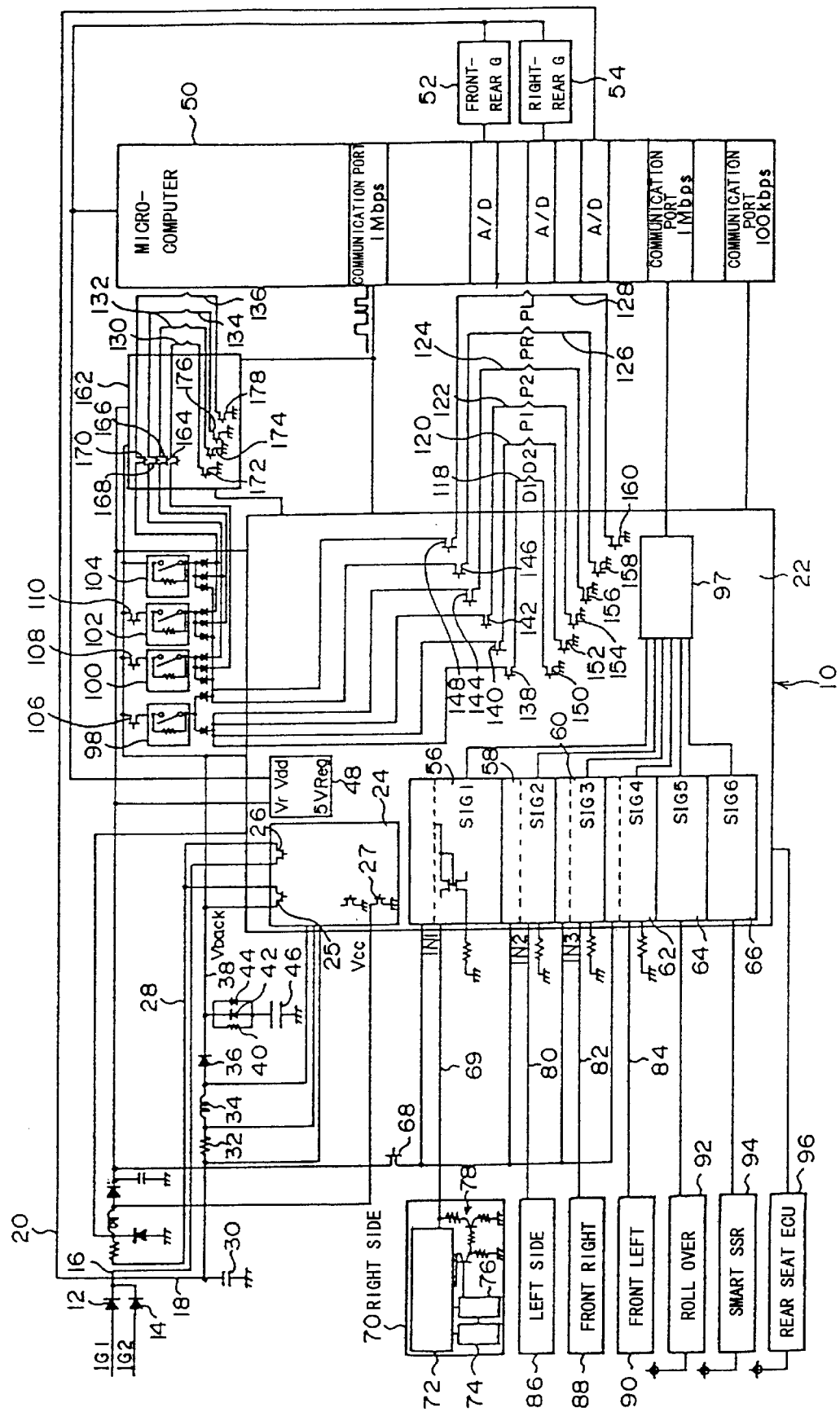
FIG. 1 is a system structure diagram of a passive safety device for a vehicle of a first embodiment of the present invention.

FIG. 1 shows a system structure diagram of a passive safety device 10 for a vehicle according to an embodiment of the present invention. The passive safety device 10 is provided with an IG1 terminal and an IG2 terminal. The IG1 and IG2 terminals are supplied with a battery voltage VB when an ignition switch of the vehicle is turned on. The IG1 and IG2 terminals are connected to a first power-supply voltage line 16, a second power-supply voltage line 18, and a voltage signal line 20 via diodes 12, 14, respectively.

The passive safety device 10 has a consolidated IC 22. The consolidated IC 22 contains a DC/DC converter 24. The DC/DC converter 24 contains a switching element 25 for back-up of power supply, a switching element 26 for decreasing voltage, and a switching element 27 for increasing voltage. The first power-supply voltage line 16 is connected to a third power-supply voltage line 28 via the switching element 26 for decreasing voltage.

The second power-supply voltage line 18 is grounded via a condenser 30 and is connected to a fourth power-supply voltage line 38 via a resistor 32, an inductor 34, and a diode 36. The fourth power-supply voltage line 38 is connected to a back-up condenser 46 via a resistor 40 and diodes 42, 44. Additionally, the fourth power-supply voltage line 38 is connected to the third power-supply voltage line 28 via the switching element 25 for back-up of power supply.

When the IG1 and IG2 terminals are supplied with the battery voltage VB, the DC/DC converter 24 converts the battery voltage VB into a predetermined driving voltage by appropriately turning on and off the switching element 26 for decreasing voltage and the switching element 27 for increasing voltage. On the other hand, when the battery voltage VB is shut off, the DC/DC converter 24 generates the driving voltage using electric power stored in the back-up condenser 46 by appropriately turning on and off the switching element 25 for back-up of power supply.

The consolidated IC 22 is provided with a 5-volt regulator 48. The 5-volt regulator 48 is supplied with the driving voltage from the third power-supply voltage line 28. The 5-volt regulator 48 generates a 5-volt voltage by decreasing the driving voltage.

The passive safety device 10 includes a microcomputer 50, a front-and-rear G sensor 52, and a right-and-left G sensor 54. The 5-volt voltage generated by the 5-volt regulator 48 is supplied to these devices.

The consolidated IC 22 contains current-limiting communication circuits 56 to 62 and communication circuits 64, 66. The current-limiting communication circuits 56 to 62 are connected to the third power-supply voltage line 28 via a switching element 68. The current-limiting communication circuits 56 to 62 are operated with power which is supplied from the third power-supply voltage line 28 via the switching element 68.

A right-side satellite sensor 70 is connected to the current-limiting communication circuit 56 via a power communication line 69. The right-side satellite sensor 70 is disposed in a center pillar on a right side of the vehicle and detects an acceleration in a lateral (right and left) direction of the vehicle. The right-side satellite sensor 70 contains a 5-volt regulator 72, a G sensor 74, microcomputer 76, and a current control circuit 78.

The current-limiting communication circuit 56 supplies a predetermined driving voltage to the power communication line 69. The driving voltage supplied to the power communication line 69 is supplied to the 5-volt regulator 72 and decreased to 5 volts inside the right-side satellite sensor 70. This 5-volt voltage is supplied to the G sensor 74 and the microcomputer 76. The G sensor 74 generates an electric signal in accordance with an acceleration generated in a right side of the vehicle. The microcomputer 76 converts the electric signal supplied from the G sensor 74 into a binary signal having a predetermined number of bits, and serially transmits the converted signal to the current control circuit 78.

The current control circuit 78 forms a bypass path which grounds the power communication line 69 when a high-level signal is supplied thereto from the microcomputer 76. Thus, when the microcomputer 76 outputs a high-level signal, a current flowing through the power communication line 69 becomes large as compared to a case where the microcomputer 76 outputs a low-level signal. The current-limiting communication circuit 56 of the consolidated IC 22 recognizes the acceleration detected by the G sensor 74 based on the above-mentioned changes in the current flowing through the power communication line 69.

A left-side satellite sensor 86, a right-front satellite sensor 88, and a left-front satellite sensor 90 are connected to the current-limiting communication circuits 58 to 62 via power communication lines 80 to 84, respectively. The left-side satellite sensor 86 is disposed in a center pillar on a left side of the vehicle. The right-front satellite sensor 88 and the left-front satellite sensor 90 are disposed on a front-right end and a front-left end of the vehicle, respectively. These satellite sensors 86 to 90 have a construction similar to that of the above-mentioned right-side satellite sensor 70. Additionally, similar to the above-mentioned current-limiting communication circuit 56, the current-limiting communication circuits 58 to 62 detect an acceleration in the lateral direction generated on a left side of the vehicle, and accelerations in the longitudinal (front and rear) direction generated on a front-left and front-right of the vehicle, respectively, based on changes in currents flowing through the power communication lines 80 to 84.

A roll-over control device 92 is connected to the communication circuit 64 of the consolidated IC 22. The roll-over control device 92 detects data representing a rolling state of the vehicle such as a roll rate and a vertical acceleration of the vehicle. The data detected by the roll-over control device 92 is supplied to the communication circuit 64.

A smart SSR control device 94 is connected to the communication circuit 64 of the consolidated IC 22. The smart SSR control device 94 detects a seating position and a size of a passenger or presence of a child seat by using a load sensor or an infrared sensor. The data detected by the smart SSR control device 94 is supplied to the communication circuit 66.

Further, a rear seat electronic control unit (rear seat ECU) 96 is connected to the consolidated IC 22. The rear seat ECU 96 controls ignition of air bags for rear seats. In the system of the present embodiment, the consolidated IC 22 and the rear seat ECU 96 communicate with each other.

The consolidated IC 22 contains a sensor-system communication circuit 97. Output signals SIG1 to SIG6 of the current-limiting communication circuits 56 to 62 and the communication circuits 64, 66 are supplied to the sensor-system communication circuit 97 with a communication rate of, for example, 125 kbps. The sensor-system communication circuit 97 serially transmits the signals SIG1 to SIG6 with an increased communication rate. In the present embodiment, the sensor-system communication circuit 97 serially transmits the signals SIG1 to SIG6 with a rate of 1 Mbps.

The passive safety device 10 includes a front safing sensor 98, a right-side safing sensor 100, a left-side safing sensor 102, and a roll-over safing sensor 104. The front safing sensor 98 is a mechanical acceleration sensor containing a contact which is closed when a deceleration corresponding to a front collision of the vehicle is generated. The front safing sensor 98 is connected to the fourth power-supply voltage line 38 via a switching element 106.

The right-side safing sensor 100 and the left-side safing sensor 102 are mechanical acceleration sensors containing contacts which are closed when an acceleration corresponding to a side collision of the vehicle is generated.

The roll-over safing sensor 104 is a mechanical acceleration sensor containing a contact which is closed when an acceleration corresponding to a roll over of the vehicle is generated. The roll-over safing sensor 104 is directly connected to the fourth power-supply voltage line 38.

The passive safety device 10 of the present embodiment includes front air bags which are disposed in a driver seat and a passenger seat, pretensioners associated with seat belts provided on the driver seat and the passenger seat, side air bags which are disposed on the side of the driver seat and the passenger seat, and head-protecting air bags which can be inflated near the head of passengers.

Figure 2:
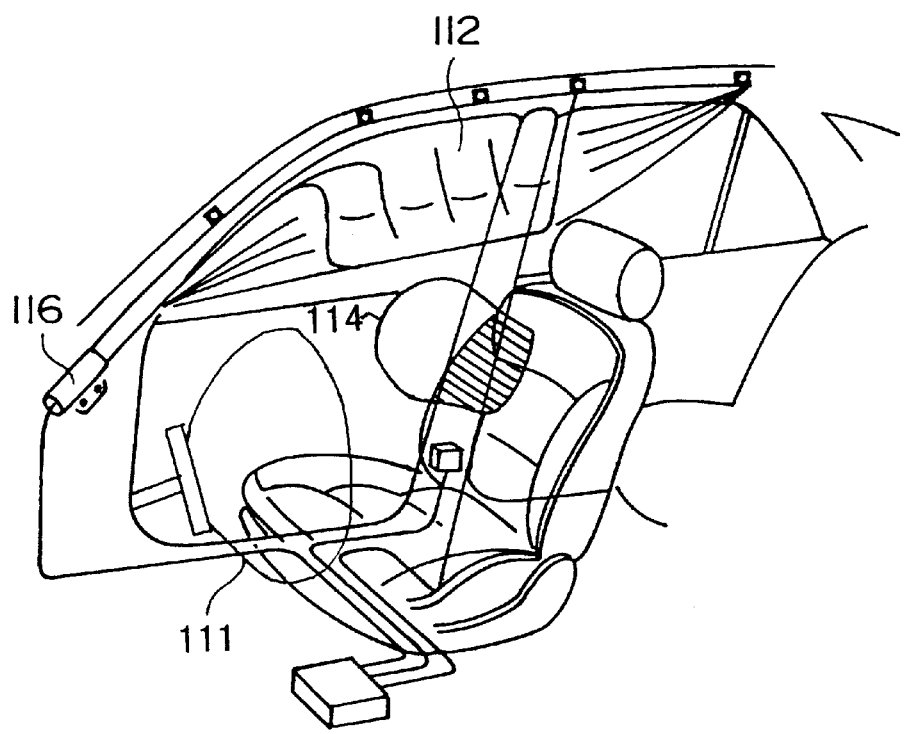
FIG. 2 is a perspective view of a head-protecting air bag and a side air bag provided to the passive safety device of the first embodiment of the present invention in inflated states.

FIG. 2 shows a perspective view of a front air bag 111, a head-protecting air bag 112, and a side air bag 114 for the driver seat. The head-protecting air bag 112 is accommodated in a front pillar and a roof side before being inflated. The front pillar also contains an inflator 116 of the head-protecting air bag 112. The head-protecting air bag 112 is inflated along a side window of the vehicle. Thus, the head-protecting air bag 112 can avoid a direct contact between the passenger's head and the vicinity of the front door window when a side collision or a roll over of the vehicle has occurred.

In the system of the present embodiment, each of the front air bags for the driver seat and the passenger seat has a multi-stage inflator. Thus, the passive safety device 10 comprises two squibs (a D1 squib 118 and a D2 squib 120) corresponding to the front air bag for the driver seat and two squibs (a P1 squib 122 and a P2 squib 124) corresponding to the front air bag for the passenger seat. The passive safety device 10 attempts to ignite appropriate squibs 118, 120, 122, or 124 based on the result of detection by the smart SSR control device 94 so that the air bags are inflated in a suitable manner in accordance with, for example, the driver's size.

The passive safety device 10 includes a PR squib 126 and a PL squib 128 corresponding to the right and left pretensioners, an SR squib 130 and an SL squib 132 corresponding to the right and left side air bags, and an ICR squib 134 and an ICL squib 136 corresponding to the right and left head-protecting air bags.

The consolidated IC 22 contains first switching elements 138 to 148 and second switching elements 150 to 160 corresponding to the squibs 118 to 128, respectively. The squibs 118 to 124 for the front air bags are connected to the front safing sensor 98 via the first switching elements 138 to 144, respectively. The squibs 126, 128 for the pretensioners are OR-connected to all of the safing sensors 100, 102, 104 via the first switching elements 146, 148, respectively.

According to the above-mentioned structure, the squibs 118 to 124 for the front air bags are ignited by the first and second switching elements 138 to 144 and 150 to 156 being turned on in a situation where the front safing sensor 98 is turned on. Additionally, the squibs 126, 128 for the pretensioners are ignited by the first and second switching elements 146, 148, 158, 160 being turned on in a situation where any one of the safing sensors 98 to 104 is turned on.

The passive safety device 10 includes an ignition IC 162. The ignition IC 162 contains first switching elements 164 to 170 and second switching elements 172 to 178 corresponding to the squibs 130 to 136, respectively. The squibs 130, 132 for the right and left side air bags are connected to the right-and left-side safing sensors 100, 102 via the first switching elements 164, 166, respectively. Additionally, the squib 134 for the right-side head-protecting air bag is OR-connected to the right-side safing sensor 100 and the roll-over safing sensor 104 via the first switching element 168. Further, the squib 136 for the left-side head-protecting air bag is OR-connected to the left-side safing sensor 102 and the roll-over safing sensor 104 via the first switching element 170.

According to the above-mentioned structure, the squib 130 for the right side air bag is ignited when all of the right-side safing sensor 100, the first switching element 164, and the second switching element 172 are turned on. Similarly, the squib 132 for the left side air bag is ignited when all of the left-side safing sensor 102, the first switching element 166, and the second switching element 174 are turned on. The squib 134 for the right-side head-protecting air bag is ignited when at least one of the right-side safing sensor 100 and the roll-over safing sensor 104 is turned on and both the first switching element 168 and the second switching element 176 are turned on. Similarly, the squib 136 for the left-side head-protecting air bag is ignited when at least one of the left-side safing sensor 102 and the roll-over safing sensor 104 is turned on and both the first switching element 170 and the second switching element 178 are turned on.

In the system of the present embodiment, the microcomputer 50 performs on-off control of the first and second switching elements 138 to 160, 164 to 178 and the switching elements 68, 106 to 110. The microcomputer 50 acquires the output signals of the front-and-rear G sensor 52 and the right-and-left G sensor 54 and the battery voltage VB supplied to the voltage signal line 20 via the corresponding A/D ports.

The microcomputer 50 has a plurality of communication ports. The microcomputer 50 communicates with the consolidated IC 22 and the ignition IC 162 via these communication ports. The microcomputer 50 detects a generation of a request to ignite each squib and gives an instruction to ignite the squib through the above-mentioned communications.

The microcomputer 50 is provided with a plurality of general ports. Two of the general ports are used to supply first and second ignition permitting signals to the consolidated IC 22. Another two of the general ports are used to supply third and fourth ignition permitting signals to the ignition IC 162.

When a specific squib is instructed to be ignited through the communication with the microcomputer 50 and the squib is permitted to be ignited by the first to fourth ignition permitting signals, the consolidated IC 22 and the ignition IC 162 turn on the first and second switching elements corresponding to that squib.

When the battery power supply is shut off, the passive safety device 10 can operate using electric power stored in the back-up condenser 46. The front air bags and the side air bags must be inflated immediately after a collision of the vehicle has occurred which could shut off the battery power supply. Thus, a relatively short back-up time of 100 to 200 milli-seconds achieved by the back-up condenser 46 is sufficient to operate the front and side air bags.

However, considering a case in which a roll over of the vehicle occurs a certain time after a collision has occurred, which roll over could shut off the battery power supply, a request to inflate the head-protecting air bag may be generated two or three seconds after the battery power supply is shut off. For this reason, it is necessary to achieve a back-up time of two or three seconds by the back-up condenser 46 to positively inflate the head-protecting air bags.

In the present embodiment, the operation mode of the system is switched to a low-power-consumption mode if necessary so that the back-up condenser 46 can achieve a longer back-up time.

Figure 3:
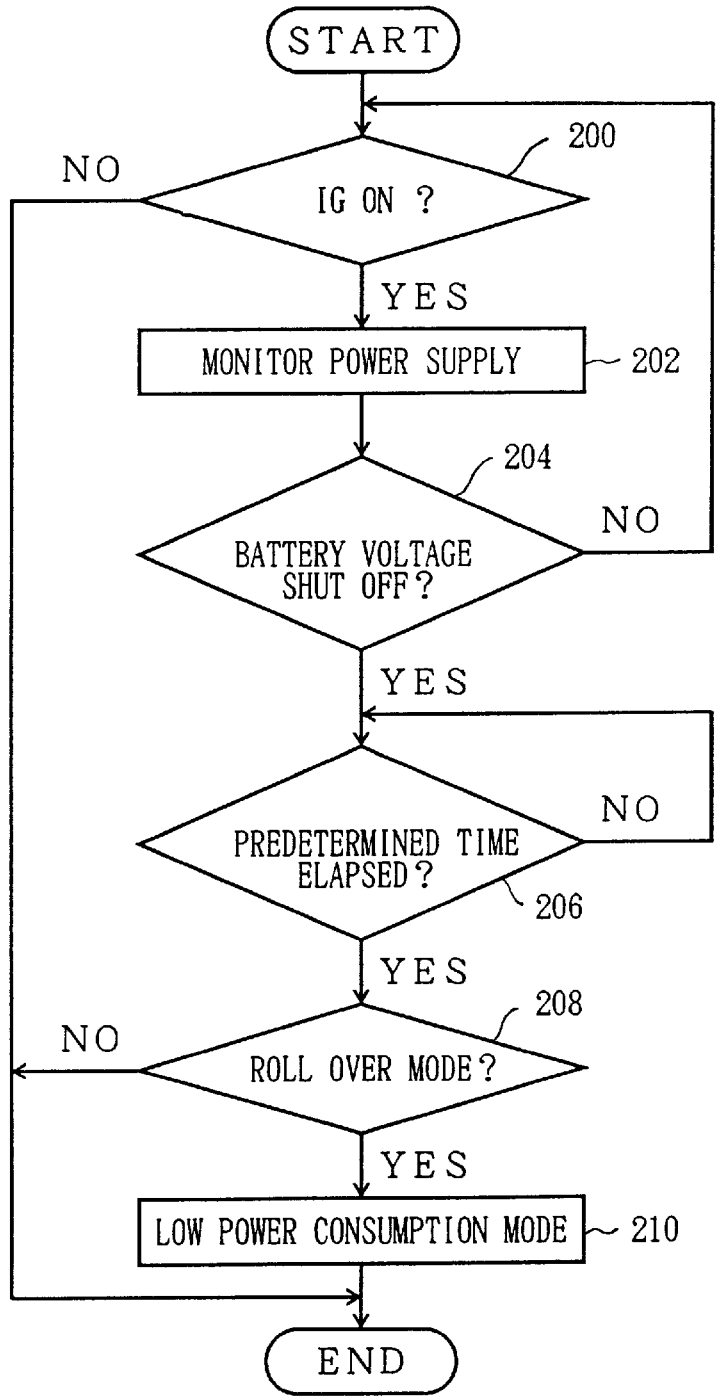
FIG. 3 is a flowchart of a control routine performed in the first embodiment of the present invention.

FIG. 3 shows a flowchart of a control routine performed by the microcomputer 50 in the system of the present embodiment. The routine shown in FIG. 3 is repeatedly performed every time when it is ended. When the routine shown in FIG. 3 is started, the process of step 200 is performed first.

In step 200, it is determined whether or not the ignition switch of the vehicle is turned on. If it is determined that the ignition switch is not turned on, the present routine is ended. On the other hand, if it is determined that the ignition switch is turned on, then the process of step 202 is performed.

In step 202, a state of the power supply is monitored. Specifically, in step 202, the battery voltage VB supplied to the voltage signal line 20 is monitored.

In step 204, it is determined whether or not the battery voltage VB is shutoff. If it is determined that the battery voltage VB is not shut off, the process of step 200 is performed again. On the other hand, if it is determined that the battery voltage VB is shut off, then the process of step 206 is performed.

In step 206, it is determined whether or not a predetermined time T1 has elapsed after the battery voltage VB was shut off. The predetermined time T1 is set to be a back-up time which is required to positively operate the front and side air bags. The process of step 206 is repeatedly performed until it is determined that the predetermined time T1 has elapsed. If it is determined that the predetermined time T1 has elapsed, then the process of step 208 is performed.

In step 208, it is determined whether or not a roll-over mode has occurred. The roll-over mode is a mode in which a roll over is expected to occur, specifically, in which a large roll rate or a large vertical acceleration is detected by the roll-over control device 92. If it is determined that the roll-over mode has not occurred in step 208, it is judged that a long back-up time is not required, and the present routine is immediately ended. On the other hand, if it is determined that the roll-over mode has occurred, then the process of step 210 is performed so as to achieve a longer back-up time.

In step 210, a process is performed to switch the operation mode of the passive safety device 10 from a normal mode to the low-power-consumption mode. Specifically, in step 210, the switching element 68 connecting the current-limiting communication circuits 56 to 62 and the third power-supply voltage line 28 is turned off, the switching elements 106 to 110 connecting the front and side safing sensors 98 to 102 and the third power-supply voltage line 28 are turned off, and the clock frequency of the microcomputer 50 is lowered. When the above-mentioned process is finished, the present routine is ended.

FIGS. 4A and 4B are time charts for illustrating the operation of the system of the present embodiment. FIG. 4A shows a change in the battery voltage VB, and FIG. 4B shows a change in the output voltage of the back-up condenser 46. Hereinafter, the output voltage of the condenser 46 is referred to as a condenser voltage VC. The time charts shown in FIGS. 4A and 4B are achieved in a case where a collision of the vehicle causing the battery voltage VB to be shut off occurred at time t0 and thereafter the roll over mode occurred.

As mentioned above, according to the system of the present embodiment, a normal operation mode is maintained until the predetermined time T1 has elapsed after the battery voltage VB was shut off. During this period, power is supplied to the sensors and the squibs corresponding to all of the air bags and pretensioners. Thus, as shown in FIG. 4B, the condenser voltage VC is decreased with a relatively large rate during the predetermined time T1.

When the predetermined time T1 has elapsed, the operation mode of the system is switched to the low-power-consumption mode on condition that the roll over mode has occurred. In the low-power-consumption mode, power supply to the current-limiting communication circuits 56 to 62 and satellite sensors 70, 86 to 90 corresponding to the front and side air bags is shut off by the switching element 68 being turned off.

Requests to inflate the front and side air bags are to be generated before the predetermined time T1 has elapsed. For this reason, operations of the front and side air bags are not affected if the above-mentioned process is performed after the predetermined time T1 has elapsed. Thus, according to the above-mentioned process, it is possible to effectively reduce the power consumption of the system without causing any substantial problems.

Additionally, according to the low-power-consumption mode, power supply to the squibs 118 to 124, 130, 132 corresponding to the front and side air bags is shut off by the switching elements 106 to 110 being turned off. When the front or side air bags are inflated before the predetermined time T1 has elapsed, a short circuit may occur near the squibs corresponding to the inflated air bags due to a shock of the inflation. According to the above-mentioned process, if such a short circuit has occurred, it is possible to positively prevent electric currents from uselessly flowing through the circuit corresponding to the inflated air bag. On the other hand, after the predetermined time T1 has elapsed, it is not necessary to supply ignition currents to the squibs 118 to 124 of the front and side air bags. Thus, according to the above-mentioned process, it is possible to effectively reduce the power consumption of the system without causing any substantial problems.

Further, in the low-power-consumption mode, power consumption of the microcomputer 50 is reduced by the clock frequency thereof being lowered. After the predetermined time T1 has elapsed, the microcomputer 50 only has to perform a process relating to the head-protecting airbags. Therefore, after the predetermined time T1 has elapsed, any substantial problems do not occur if the operating speed of the microcomputer 50 is lower than that during the period until the predetermined time T1 has elapsed in which a process relating to all of the air bags and pretensioners is required. Thus, according to the above-mentioned process, it is possible to effectively reduce the power consumption of the system without substantially affecting the operation of the system.

As mentioned above, in the low-power-consumption mode, the power consumption can be effectively reduced without affecting the operation of the system. Thus, according to the system of the present embodiment, it is possible to achieve a moderate decreasing trend of the condenser voltage VC after the predetermined time T1 has elapsed, as shown in FIG. 4B.

A predetermined voltage VON shown in FIG. 4B is the lowest power-supply voltage with which the system can operate. That is, in the system of the present embodiment, the back-up time achieved by the back-up condenser 46 is defined as a time in which the condenser voltage VC is maintained to be equal to or higher than the voltage VON. As shown in FIG. 4B, a sufficiently long back-up time T2 can be obtained by achieving the low-power-consumption mode after the predetermined time T1 has elapsed. Thus, according to the system of the present embodiment, it is possible to positively inflate the head-protecting air bags if a roll over of the vehicle has occurred after the battery power supply is shut off.

In the above-mentioned embodiment, the operation mode of the system is switched to the low-power-consumption mode when both the conditions (1) that the predetermined time T1 has elapsed after the battery power supply is shut off and (2) that the roll-over mode of the vehicle has occurred are established. However, the present invention is not limited to this, but the operation mode may be switched to the low-power-consumption mode when any one of the above two conditions is established.

Additionally, in the above-mentioned embodiment, when the operation mode is switched to the low-power-consumption mode, all the processes of (1) shutting off power supply to the sensors corresponding to the front and side air bags, (2) shutting off power supply to the squibs corresponding to the front and side air bags, and (3) lowering the clock frequency of the microcomputer 50 are performed. However, the present invention is not limited to this, but at least one of these processes may be performed.

Now, a description will be given of a passive safety device 220 of a second embodiment of the present invention with reference to FIG. 5.

The passive safety device 220 of the present embodiment includes a consolidated control device 222. The consolidated control device 222 contains a power-supply circuit 224 and a switch circuit 226. The power-supply circuit 224 is connected to an onboard battery 228. Additionally, the power-supply circuit 224 is connected to an external power supply 230 via the switch circuit 226. The external power supply 230 is disposed in a cabin of a vehicle so that it is difficult to damage the external power supply 230 when a collision of the vehicle has occurred. The switch circuit 226 is so constructed that it is closed when the power supply from the on-board battery 228 to the power-supply circuit 224 is shut off.

According to the above-mentioned structure, if the power supply to the power-supply circuit 224 from the on-board battery 228 is shut off due to a collision of the vehicle, it is possible to continue the operation of the consolidated control device 222 by supplying power to the power-supply circuit 234 from the external power supply 230.

When a predetermined collision of the vehicle occurs, the consolidated control device 222 performs ignition control of various air bags and pretensioners, generates a door lock canceling signal, generates a fuel-cut signal, and delivers an aid requesting signal (Mayday signal) to the outside of the vehicle. Thus, the consolidated control device 222 requires relatively large power to complete these processes. According to the system of the present embodiment, if a collision of the vehicle causing damages to the on-board battery 228 occurs, it is possible to supply power to the consolidated control device 222 from the external power supply 230. Thus, in the system of the present embodiment, the consolidated control device 222 can positively carry out the above-mentioned various necessary processes.

The present invention is not limited to these embodiments, but variations and modifications may be made without departing from the scope of the present invention.

The present application is based on Japanese priority application No. 10-35981 filed on Feb. 18, 1998, the entire contents of which are hereby incorporated by reference.

What is claimed is:

1. An ignition control method for controlling an operation of a passive safety device for a vehicle, the method comprising:

providing a passive safety device including a high-response safety device which requires a relatively short time to determine a request of operation and a low-response safety device which requires a relatively long time to determine a request of operation;

detecting a predetermined state in which a request of operation to the low-response safety device is expected to occur; and determining an establishment of a condition for shifting operation of the passive safety device from a normal mode to a low-power-consumption mode when at least one of a first condition that a predetermined time has elapsed after power supply is shut off and a second condition that the predetermined state is detected in said detecting step is established.

2. The ignition control method for controlling an operation of a passive safety device as claimed in claim 1, comprising:

operating said passive safety device by using an on-board battery as power supply, and detecting shutoff of the power supply based on the voltage of the on-board battery.

3. The ignition control method for controlling an operation of a passive safety device as claimed in claim 1, wherein said step of determining comprises:

defining said predetermined time as a time required to positively operate said high-response safety device.

4. The ignition control method for controlling an operation of a passive safety device as claimed in claim 1, wherein said step of providing comprises:

providing a front air bag and/or a side air bag as said high-response safety device and providing a head-protecting air bag as said low-response safety device.

5. The ignition control method for controlling an operation of a passive safety device as claimed in claim 4, comprising:

performing at least one of the processes of shutting off power to a request-of-operation detecting part which detects a request of operation to said front and/or side air bags, shutting off an ignition signal to an ignition device for said front and/or side air bag, and lowering an operation clock frequency of said passive safety device when operation of said safety passive device is in said low-power-consumption mode.

6. The ignition control method for controlling an operation of a passive safety device as claimed in claim 4, wherein said step of detecting comprises:

defining said predetermined state as a state in which a roll over of a vehicle is expected to occur.

7. An ignition control method for controlling an operation of a passive safety device for a vehicle, the method comprising:

providing a passive safety device including a front air bag and/or a side air bag which require a relatively short time to determine a request of operation and a head-protecting air bag which requires a relatively long time to determine a request of operation;

detecting a predetermined state in which a request of operation to the head-protecting air bag is expected to occur; and determining an establishment of a condition for shifting operation of the passive safety device from a normal mode to a low-power-consumption mode when at least one of a first condition that a predetermined time has elapsed after power supply is shut off and a second condition that the predetermined state is detected in said detecting step is established.

8. The ignition control method for controlling an operation of a passive safety device as claimed in claim 7, comprising:

performing at least one of the processes of shutting off power to a request-of-operation detecting part which detects a request of operation to said front and/or side air bags, shutting off an ignition signal to an ignition device for said front and/or side air bag, and lowering an operation clock frequency of said passive safety device when operation of said safety passive device is in said low-power-consumption mode.

9. The ignition control method for controlling an operation of a passive safety device as claimed in claim 7, wherein said step of detecting comprises:

defining said predetermined state as a state in which a roll over of a vehicle is expected to occur.

10. An ignition control method for controlling an operation of a passive safety device for a vehicle, the method comprising:

providing a power supply circuit in the passive safety device, the power supply circuit connected to a battery of the vehicle;

providing a switch circuit in the passive safety device, the power supply circuit being connected to an external power supply via the switch circuit, the switch circuit being constructed so that the connection between the power supply circuit and the external power supply is closed by the switch circuit when power supplied from the battery to the power supply circuit is shut off; and supplying power from the external power supply to the power supply circuit of the passive safety device through the switch circuit when the power supply from the battery to the power supply circuit is shut off due to a collision of the vehicle.

* * * * *